Feb. 16, 1954     H. R. WILSON     2,669,264
GUARD FOR THE PERIPHERY OF ROTARY
DISK CUTTERS ON MACHINE TOOLS
Original Filed Dec. 3, 1946     2 Sheets-Sheet 1
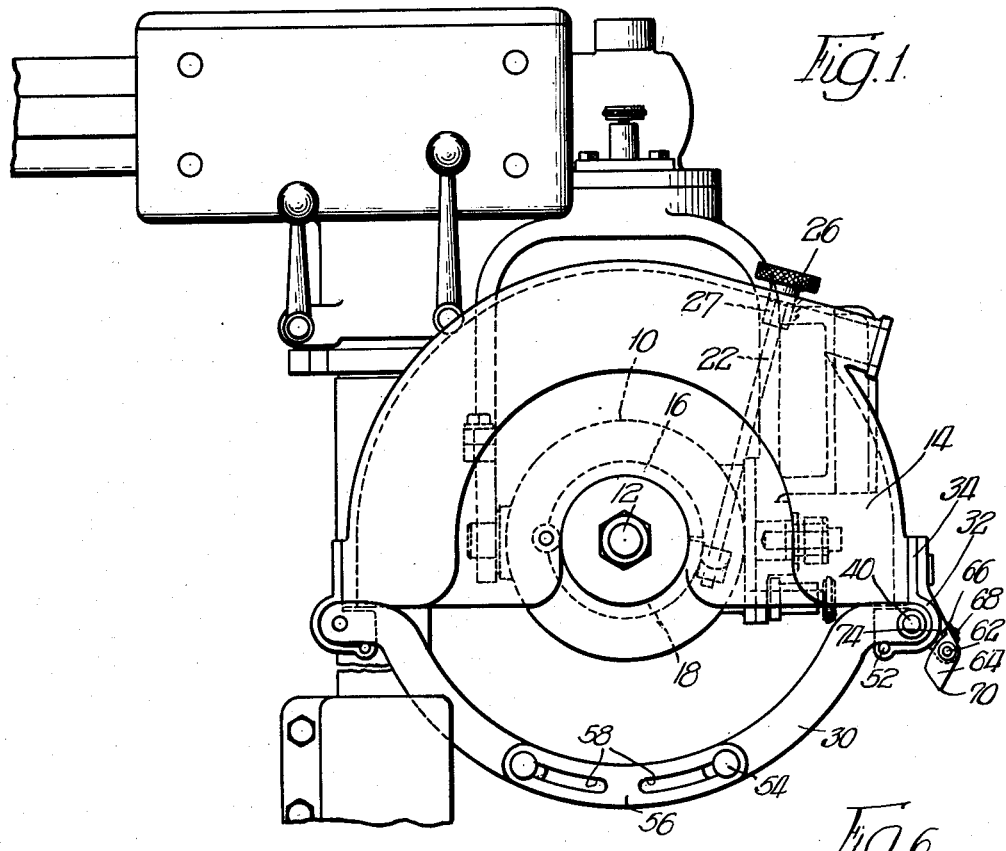
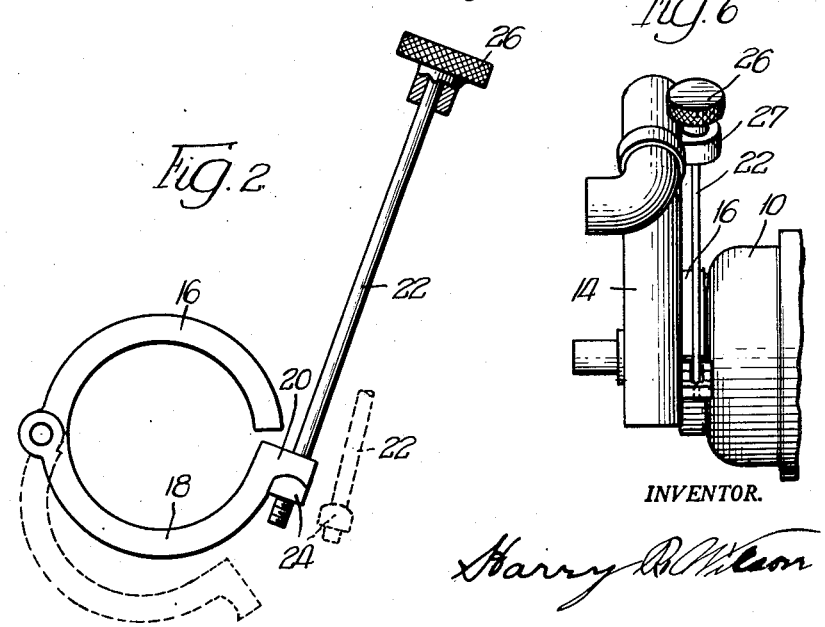
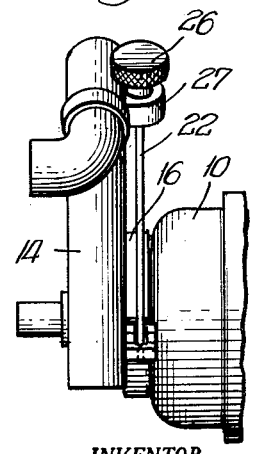
INVENTOR.
Harry R. Wilson

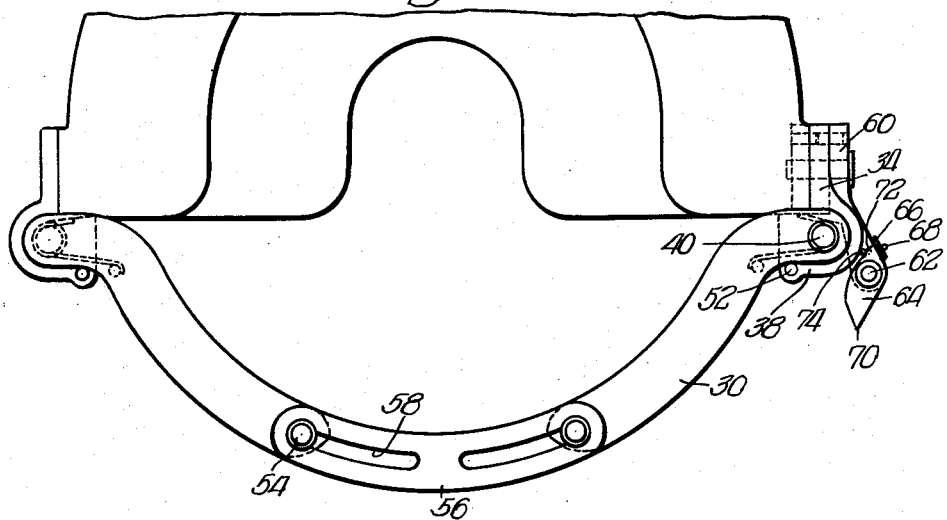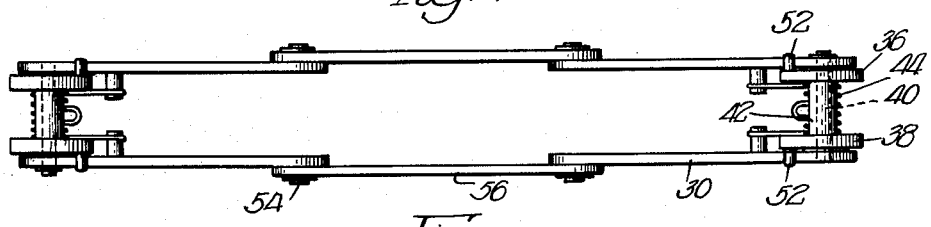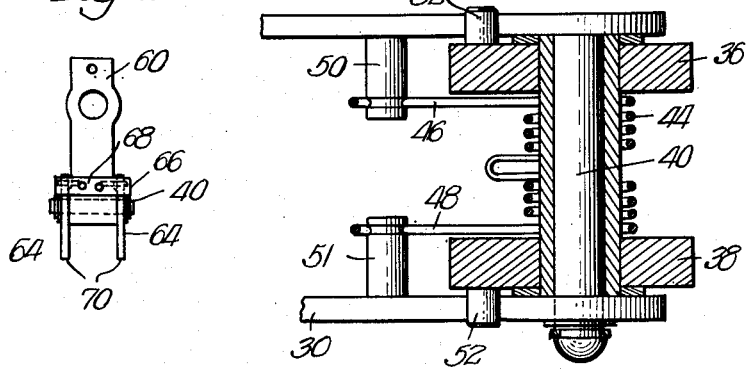

Patented Feb. 16, 1954

2,669,264

UNITED STATES PATENT OFFICE 2,669,264

GUARD FOR THE PERIPHERY OF ROTARY DISK CUTTERS ON MACHINE TOOLS

Harry R. Wilson, Waterloo, Iowa, assignor, by mesne assignments, to Skil Corporation, a corporation of Delaware Original application December 3, 1946, Serial No. 713,615. Divided and this application July 12, 1951, Serial No. 236,327

6 Claims. (Cl. 143—159)

The present invention relates to improvements in a machine tool, and more particularly to a machine tool of the radial saw type.

There are certain inherent dangers in operating any tool. Safety guards commonly are thought of as a nuisance and are not used by the worker for his protection but are discarded, or removed by him because they partially block good visibility of the work and add friction to hand operation as they drag over or impinge upon the work. When ripping with a tool of the present type in green wood or if a knot is struck, the piece of wood may tend to be kicked or thrown violently from the work unit. Various anti-kick back arrangements have been tried without too successful solution.

One object of the present invention is to provide a machine with safety features that will not interfere with the normal operation of the machine and will act affirmatively to protect the operator.

Various other objects of this invention will be pointed out hereinafter with reference to the drawings wherein an exemplification of an embodiment of the invention is set forth. This application is a division of my application filed December 3, 1946, Serial No. 713,615, for Machine Tool, issued August 14, 1952, as Patent No. 2,564,350.

Fig. 1 is a view in side elevation of a portion of a radial saw machine embodying one form of the present invention.

Fig. 2 is a fragmentary view of the upper saw guard locking means.

Fig. 3 is a view in elevation of the lower saw guard and rip guard and their attachment to the upper saw guard, which is shown broken away, slightly enlarged over Fig. 1.

Fig. 4 is a bottom plan view of Fig. 3.

Fig. 5 is an enlarged fragmentary view of the right end portion of Fig. 4.

Fig. 6 (Sheet 1) is a fragmentary end view of the upper saw guard showing the means of attaching it to the end bell of the motor housing.

Fig. 7 is a view in front elevation of the rip guard.

The lower safety guard includes a series of links on either side of the saw blade that offer little resistance to a work piece as the work unit is moved over it and constantly moves in front of the blade to warn a careless operator of the approach of the blade. Since it is mounted on either side of the blade, the operator has a constant view of the work and cutting line. The links on one side of the blade operate independently of the links on the other side, as in a mitre or bevel cut, to constantly protect the operator. With former guards, a bevel or mitre cut might protect the operator from one side only, leaving the blade entirely exposed on the other.

When ripping, the upper saw guard normally is swung around so that it just clears the work piece. The fan-like action of the blade picks up the sawdust and carries it out an exhaust opening in the guard to free the work of this dust. An anti-kick back attachment may be mounted on the upper guard at a point where it will yieldingly drag over the work piece as it is fed through the blade and positively dig into the work piece and prevent it from being thrown or kicked from the machine by the blade should the latter strike a knot in the wood or a too green section.

With reference to Fig. 1 it will be noted that from the motor housing 10 there extends a driven shaft or arbor 12. Upon the end bell for the motor housing is mounted an upper saw guard 14 of the usual arcuate shape, by means of a split saw guard collar having the integral outwardly flanged upper collar member 16 (Figs. 1 and 2) and a lower collar member 18 hinged at one end to an end of the upper collar member. The free end of the lower collar member is flanged outwardly as at 20 and is slotted to receive a clamping rod 22. The under side of flange 20 adjacent the slot may be concave to receive the convex portion of a clamping nut 24 screwed up over the threaded lower end of rod 22 in a concavo-convex relationship.

At its upper end rod 22 carries a large thumb knob 26 and fits loosely within and is suspended from a retaining ring 27 suitably mounted to the upper portion of guard 14. Preferably the parts are so mounted that rod 22 may be fitted into slotted flange 20 at a slight angle to the vertical and be held therein by clamping nut 24. A slight turn of knob 26 permits collar 18 to loosen from a clamped position on the end bell so that the guard may be rotated to any desired position thereon. Nut 24, because of its concavo-convex interfit with flange 20 may be slightly loosened without having rod 22 drop out of its slot. A further turn permits the rod to drop out of the slot when the interfit is broken and the entire guard may be removed quickly and easily.

A lower safety guard for a saw blade assembly is shown in Figs. 1, 3 and 4. Generally this guard includes a plurality of links hingedly mounted or articulated to each other and to the upper guard and so arranged and constructed as to hang alongside of and below the lower edge of a circular saw blade to protect an operator's hand from a rotating blade. The links are designed to yield progressively as the blade is moved through a work piece and to be positively returned to normal full guard position as the blade emerges therefrom.

The end links 30 are semi-circular for most of their length to conform to the periphery of a saw blade but are curved outwardly at their outer ends to be pivotally mounted in a bracket member 32. This bracket comprises a flat plate portion 34 mounted to the upper saw guard and has two depending ears 36 and 38 apertured to receive a hinge pin 40 and its spacer sleeve 42 suitably mounted therein. The outwardly curved portions of the end links are mounted over the hinge pin and spaced from each other by the sleeve 42. Over the sleeve 42 a spring member 44 may be mounted having free ends 46 and 48 in operative pressing contact with spring studs 50 and 51 respectively mounted on links 30 for that purpose. Ear members 36 and 38 have stop members 52 to prevent the links from being forced out of operative guard position by spring means 44.

At the inner end of each link 30 is mounted a center link pin 54. A center link member 56, arcuate in shape and following the general curvature of the saw blade, is slotted as shown at 58 and is mounted over the pin 54 and suitably held in place for articulated movement between the links. In operation as the work unit is advanced to cut a work piece, a portion of an advance link 30 will strike the work piece and be pivoted inwardly and upwardly around the hinge member 40. At the same time the central link member will be bent upwardly and inwardly around its rear pin and slot arrangement while the forward slot 58 will allow its pin 54 to slide therein permitting this movement. As the center link passes over the work piece the rear pin and slot arrangement will permit the central and rear links to slide smoothly over the work piece without dragging thereon. Due to its curved formation, the lower guard will touch or contact the work piece substantially tangentially or at only one point at a time instead of throughout a substantial portion of the work piece.

As the lower guard passes beyond the work piece, springs 44 return the links to the normal guard position.

A rip safety guard may be attached to the upper saw guard over the lower guard plate 32 (Figs. 1 and 3) and as shown includes a guard bracket 60 which may be positioned between ears 36 and 38 and suitably attached through plate 32 into the upper saw guard 14. It may be slanted rearwardly to clear the hinge member 40 and have an enlarged lower portion which may be bored or drilled to receive a hinge pin 62. Ratchet members 64 are pivotally mounted over the hinge pin on either side of the enlarged portion and are yieldingly held in operative position by a flat spring member 66 that is mounted on the bracket as at 68 and overlies the ratchet members. The latter terminate in teeth portions 70 adapted to yieldingly slide over a work piece as it passes beneath in one direction and which will dig in and positively hold the work piece against movement in a reverse direction should the saw blade strike a knot or green portion. A stop member 72 may be formed on the ratchet member and a stop stud 74 mounted on guard bracket 32 to hold the teeth in a positive guard position upon a reversal of the work piece.

In practice, the upper saw guard is rotated around its collar 16 until the teeth 70 are slightly more than in contact with a work piece. As the latter is fed beneath the saw from right to left in Fig. 1, the teeth will yield and permit this movement. A reverse movement will cause the teeth to dig in to the work piece due to the action of stop member 72 and stud 74 and hold the piece from being kicked or thrown from the saw.

I claim:

1. The combination with a radial saw machine having an upright supporting member and a saw blade work unit movable toward and away from said supporting member, of means for guarding an operator from injury from said blade, said means including an upper saw guard substantially enclosing the upper half of said saw blade, and a lower saw guard encircling the lower periphery of said blade, said lower guard including a plurality of articulated link members comprising pairs of end links each pivotally suspended from said upper guard and a pair of intermediate links connecting said end links.

2. The combination as defined in claim 1 wherein the articulated link members include end link members curved substantially in the curvature of the saw blade edge and pivoted at their outer ends to the upper guard and having pin members on their inner ends, and center link members formed substantially in the curvature of the saw blade edge and being slotted to receive said pin members in both a pivotal and sliding relationship.

3. In a radial saw, the combination with a driven shaft extending through a protecting shell, a saw blade mounted on said shaft adjacent the outer end of said shell and saw guard mounted over the upper portion of said blade and supported from said shell, of means for adjustably locking said guard in a predetermined position with respect to said shell and blade, said means including a split saw guard collar mounted on said saw guard and adapted to be clamped tightly to said shell, the lower portion of said collar being hinged at one end to the upper portion thereof and free at its other end, the free end being open-end slotted, a clamping rod rotatably suspended from said saw guard and extending through the slotted free end of the lower portion of said collar member, said rod being threaded at its lower end, and an interiorly threaded clamping nut on the lower end of said rod and adapted to be tightened into clamping position against the free end of the lower portion of said collar member.

4. A radial saw of the type described in claim 3 wherein the free end of the lower portion of the collar member is adapted to receive said clamping rod as extended therethrough and said clamping nut meets the free end of the lower portion of said collar member in a concavo-convex relationship, said clamping nut being retained on said rod when said collar member is in released position.

5. In a radial saw, the combination with a driven shaft extending through a protecting shell, a saw blade mounted on said shaft adjacent the outer end of said shell and a saw guard mounted over the upper portion of said blade and supported from said shell, of means for adjustably locking said guard in a predetermined position with respect to said shell and blade, said means including a split saw guard collar mounted on said saw guard and adapted to be clamped tightly to said shell, the lower portion of said collar being hinged at one end to the upper portion thereof and free at its other end, the free end of the lower portion being flanged outwardly and having a clamping slot therein, a clamping rod loosely suspended from said saw guard for a swinging movement into and out of said clamping slot and threaded at its lower end, an interiorly threaded clamping nut on the lower end of said rod adapted to be tightened into clamping position against the flanged lower portion of said collar member.

6. A removable upper guard for a radial saw machine including an upper arcuate member on said guard adapted to fit over the motor end bell, a lower arcuate member pivoted at one end to the guard to cooperate with the upper arcuate member in clamping the guard to the end bell, a clamping rod, attaching means at both ends of said rod for holding said rod to the guard at one end and at the other end to the free end of said lower arcuate member, a clamping means at one end of said rod to tighten the lower arcuate member into a clamped position for attaching said guard to said motor end bell, and slotted means associated with one of said attaching means to release the rod therefrom, permitting the removal of said upper guard without removing the nut from the rod.

HARRY R. WILSON.

References Cited in the file of this patent

UNITED STATES PATENTS

| Number | Name | Date |
|---|---|---|
| 1,481,569 | Tannewitz | Jan. 22, 1924 |
| 1,594,772 | Fournier | Aug. 3, 1926 |
| 1,600,604 | Sorlien | Sept. 21, 1926 |
| 1,738,763 | De Walt | Dec. 10, 1929 |
| 1,858,459 | Ramey | May 17, 1932 |
| 1,888,679 | Knapp | Nov. 22, 1932 |
| 2,010,851 | Drummond | Aug. 13, 1935 |

FOREIGN PATENTS

| Number | Country | Date |
|---|---|---|
| 21,328 | Great Britain | Oct. 11, 1898 |